(12) United States Patent
Xie et al.

(10) Patent No.: US 11,586,629 B2
(45) Date of Patent: Feb. 21, 2023

(54) METHOD AND DEVICE OF STORING DATA OBJECT

(71) Applicant: Samsung Electronics Co., Ltd., Suwon-si (KR)

(72) Inventors: Fengtao Xie, Xi'an (CN); Yuehua Dai, Xi'an (CN); Haizhu Shao, Xi'an (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 115 days.

(21) Appl. No.: 15/947,019

(22) Filed: Apr. 6, 2018

(65) Prior Publication Data

US 2019/0057090 A1 Feb. 21, 2019

(30) Foreign Application Priority Data

Aug. 17, 2017 (CN) .......................... 201710706073.6

(51) Int. Cl.
*G06F 16/00* (2019.01)
*G06F 16/2455* (2019.01)
*G06F 16/22* (2019.01)
*G06F 16/23* (2019.01)
*G06F 16/13* (2019.01)
*G06F 16/182* (2019.01)

(52) U.S. Cl.
CPC ........ *G06F 16/24552* (2019.01); *G06F 16/13* (2019.01); *G06F 16/182* (2019.01); *G06F 16/2291* (2019.01); *G06F 16/2358* (2019.01)

(58) Field of Classification Search
CPC .............................................. G06F 16/24552

USPC ......................................................... 707/705
See application file for complete search history.

(56) References Cited

U.S. PATENT DOCUMENTS

| | | | |
|---|---|---|---|
| 8,412,881 B2 | 4/2013 | Boyle | |
| 9,378,088 B1* | 6/2016 | Piszczek | G06F 3/0619 707/707 |
| 2008/0005192 A1* | 1/2008 | Jung | G06F 16/2358 707/707 |
| 2010/0332401 A1* | 12/2010 | Prahlad | G06F 16/1844 711/E12.001 |
| 2011/0153979 A1 | 6/2011 | Boyle | |
| 2013/0041872 A1* | 2/2013 | Aizman | G06F 16/182 707/690 |
| 2014/0297776 A1* | 10/2014 | Volvovski | G06F 16/182 709/212 |

(Continued)

FOREIGN PATENT DOCUMENTS

| | | |
|---|---|---|
| CN | 102760101 A | 10/2012 |
| CN | 106227677 A | 12/2016 |
| WO | WO-2013174305 A1 | 11/2013 |

*Primary Examiner* — Alexandria Y Bromell
(74) *Attorney, Agent, or Firm* — Harness, Dickey & Pierce, P.L.C.

(57) ABSTRACT

A method of storing a data object includes dividing data of a data object into a first part of data and a second part of data, in response to receiving a writing request for a data object, the first part of data including a data field of the data object, the second part of data including a meta data of the data object; writing the first part of data into a first data file stored in a first external storage device; and writing, into a second data file stored in a second external storage device, first location information, and the second part of data, the first location information including location information of the first part of data within the first external storage device.

20 Claims, 9 Drawing Sheets

(56) References Cited

U.S. PATENT DOCUMENTS

2014/0365722 A1    12/2014  Yi et al.
2016/0196324 A1*   7/2016   Haviv .................. G06F 3/0685
                                                    707/649
2017/0083762 A1*   3/2017   Segalovitz ............ G06V 10/25
                                                    707/707

* cited by examiner

METHOD AND DEVICE OF STORING DATA OBJECT

CROSS-REFERENCE TO RELATED APPLICATIONS

A claim for priority under 35 U.S.C. § 119 is made to Chinese Patent Application No. 201710706073.6 filed on Aug. 17, 2017, in the State Intellectual Property Office (SIPO), the entire contents of which are hereby incorporated by reference.

BACKGROUND

Field

The present disclosure relates to a technical field of data storage, and more particularly, relates to a method and device of storing a data object.

Related Art

In a database or file system of the prior art, a B/B+ tree, a Hash table, a skip list and the like are generally used as a cache management manner thereof, and data is generally associated with these structures in a form of object. Taking the B/B+ tree as an example, respective data objects are respectively stored in respective tree nodes. In the B+ tree, data information is transferred to a leaf node, and an inner node of the B+ tree is only used to store a scope of a related Key value. Since a data node is relatively large and it may occupy a huge amount of memory, it often causes insufficient memory when performing big data analysis. At this time, a database or a file system discards a memory data page according to a corresponding replacement algorithm (for example, a Least Recently Used (LRU) algorithm). After a memory page is discarded, the B tree of the B+ tree may adjust the B tree or the B+ tree according to discarded data, to ensure balance of the B tree or the B+ tree. When new data is loaded into a memory, a structure of the B tree or the B+ tree is changed, and at this time, tree adjustment is also required. A similar operation means also exists in the Hash table and the skip list.

That is, the existing method of storing a data object results in that the data object loaded into a cache region expends an extremely large cache space, so that a large part of the memory is taken up. Insufficient memory will cause more cache loss in data retrieving, a frequent in-and-out page replacement in and out, a frequent adjustment of a memory structure, and a huge amount of CPU time spent by the system in the page replacement operation, so that a client request and an input/output (I/O) request cannot be processed in time. Moreover, insufficient memory may also lead to a requirement of the database or the file system to perform a complicated and time-consuming operation in cache management, reducing performance of the database or the file system.

SUMMARY

A method and device of storing data object according to at least some example embodiments of the inventive concepts, can store data, which is required for retrieval of a data object and has high access frequency, to be separated from a big data block which is less relevant to the retrieval, so as to facilitate a process of loading only the data that is required for retrieval of a data object and has high access frequency into a cache region. The method and device according to at least some example embodiments of the inventive concepts can improve the speed of data retrieval while effectively reducing a cache space occupied by respective data objects, so as to address problems caused by the data object occupying more memory.

According to at least some example embodiments of the inventive concepts, a method of storing a data object includes dividing data of a data object into a first part of data and a second part of data, in response to receiving a writing request for a data object, the first part of data including a data field of the data object, the second part of data including a meta data of the data object; writing the first part of data into a first data file stored in a first external storage device; and writing, into a second data file stored in a second external storage device, first location information, and the second part of data, the first location information including location information of the first part of data within the first external storage device.

According to at least some example embodiments of the inventive concepts, a device of storing a data object includes memory storing computer-executable instructions; and a processor configured to execute the computer-executable instructions such that the processor is configured to divide data of a data object into a first part of data and a second part of data, in response to receiving a writing request for a data object, write the first part of data into a first data file stored in a first external storage device, and write first location information and the second part of data into a second data file stored in a second external storage device, the first part of data including a data field of the data object, the second part of data including a meta data of the data object, the first location information including location information of the first part of data within the first external storage device.

According to at least some example embodiments of the inventive concepts, a non-transitory computer readable storage medium stores computer-executable instructions that, when executed by a processor, cause the processor to perform operations including dividing data of a data object into a first part of data and a second part of data, in response to receiving a writing request of a data object, the first part of data including a data field of the data object, the second part of data including a meta data of the data object; writing the first part of data into a first data file stored in a first external storage device; and writing location information of the first part of data in the first external storage device and the second part of data into a second data file stored in a second external storage device.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1A:
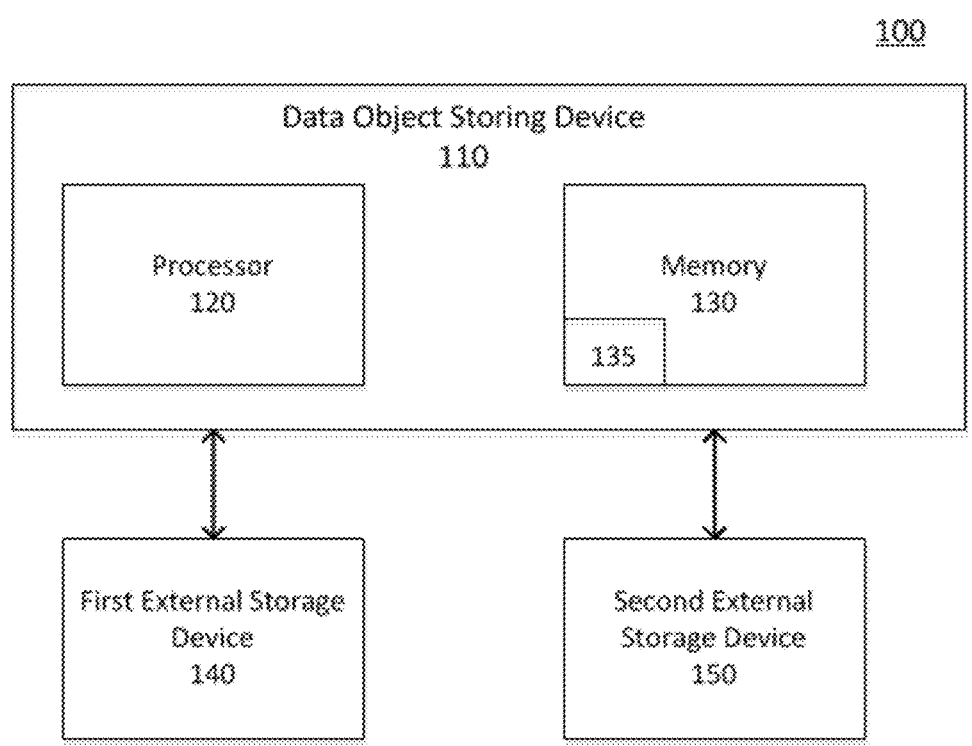
FIG. 1A is a diagram of at least a portion of a file system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1A is a diagram of a portion of a file system 100 according to at least some example embodiments of the inventive concepts. As is illustrated in FIG. 1A, according to at least some example embodiments of the inventive concepts, a file system 100 includes a data object storing device 110, a first external storage device 140 and a second external storage device 150. As is illustrated in FIG. 1A, according to at least some example embodiments of the inventive concepts, a data object storing device 110 includes a processor 120 and a working memory 130.

The processor 120 is a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

According to at least some example embodiments, the working memory 130 may include a cache region 135.

Examples of the types of memory the working memory 130 may be implemented by include, but are not limited to, volatile memory, nonvolatile memory, static random access memory (RAM)(SRAM), dynamic RAM (DRAM), synchronous DRAM (SDRAM), and NAND Flash memory.

According to at least some example embodiments of the inventive concepts, the working memory 130 may store computer-executable instructions (e.g., program code) corresponding to any or all operations described in the present disclosure as being performed by the data object storing device 110. According to at least some example embodiments of the inventive concepts, any or all operations described in the present disclosure as being performed by the data object storing device 110 may be performed, for example, by the processor 120 executing computer-executable instructions (e.g., program code) stored in the working memory 130.

According to at least some example embodiments of the inventive concepts, operations described in the present disclosure with respect to FIGS. 1-7 may be performed by the processor 120 executing program code that is stored in the working memory 130 and includes computer-executable instructions corresponding to any or all of the operations described in the present disclosure with respect to FIGS. 1-7.

According to at least some example embodiments, the file system 100 may be or include a database, and the database may be or include the data object storing device 110, the first external storage device 140 and the second external storage device 150. Thus, file system 100 may also be referred to, in the present disclosure, as database 100.

As is illustrated in FIG. 1A, the data object storing device 110 may send data to, and/or receive data from, one or both of the first external storage device 140 and the second external storage device 150. The first external storage device 140 and second external storage device 150 will be discussed in greater detail below with reference to FIG. 1B.

Figure 1B:
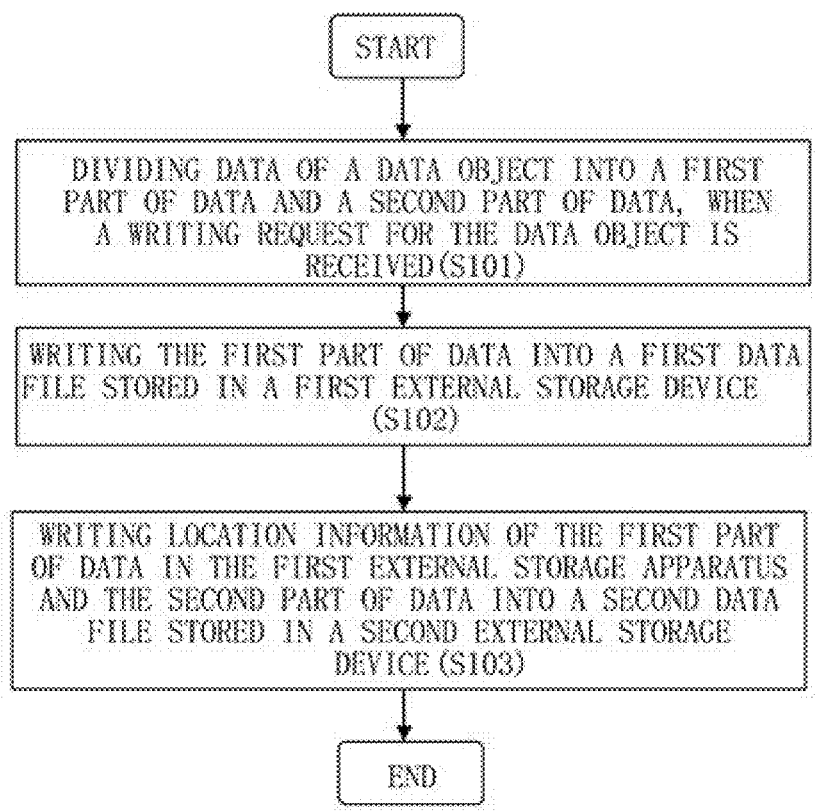
FIG. 1B illustrates a flowchart of a method of storing a data object according to at least one example embodiment of the inventive concepts.

FIG. 1B illustrates a flowchart of a method of storing a data object according to at least one example embodiment of the inventive concepts.

Referring to FIG. 1B, in step S101, the data object storing device 110 divides data of a data object into a first part 310 of data and a second part 320 of data, when a writing request for a data object is received, wherein the first part 310 of data includes a data field of the data object, and the second part 320 of data includes a meta data of the data object. For example, in step S101, the data object storing device 110 may divided data of a data object into a first part 310 of data and a second part 320 of data in response to receiving a writing request for the data object.

Here, the data object may be understood as a group of data associated with each other or a set of data associated with each other. For example, a set which records at least one kind of property information on a user can be regarded as a data object.

The data object may include a plurality of meta data and a plurality of data fields, and each of the data fields may correspond to at least one data object.

According to at least some example embodiments of the inventive concepts, the meta data is used for description of data (i.e., the meta data is data that describes other data), and mainly describes information of a data property. As an example, the meta data of the data object may include an index field of the data object and description information of the index field, and description information of each of the data fields of the data object. For example, the description information of the data field may be information of the data field, such as a name, a type and the like of the data field. The description information of the index field may be information of the index field, such as a name, a type and the like of the index field.

For example, when a data object is a set which records at least one kind of property information on a user, the description information of the index field of the data object may be a user ID. The index field may be a specific value of the user ID. The description information of each of the data fields may be a name or a type, such as an identification number, a phone number, an address and the like. Each of the data fields may be a specific value of the identification number of the user, a specific value of the phone number of the user, a specific value of the address of the user, and the like.

As an example, the first part 310 of data may include all of the data fields in the data object, and the second part 320 of data may include a meta data included in the data object.

As another example, a length of the data field included in the first part 310 of data may be larger than a desired or, alternatively, predetermined threshold value, and the second part 320 of data may further include a data field in the data object, wherein a length of the data field is not larger than a desired or, alternatively, predetermined threshold value. In other words, the first part 310 of data may include a data field of which the length is larger than a desired or, alternatively, predetermined threshold value in the data object, and the second part 320 of data may include the meta data included in the data object and a data field of which the length is not larger than the desired or, alternatively, predetermined threshold value in the data object. Here, it should be understood that a size of the desired or, alternatively, predetermined threshold value may be set according to an actual situation (for example, a size of a memory and the like).

In step S102, the data object storing device 110 writes the first part 310 of data into a first data file stored in a first external storage device 140.

In step S103, the data object storing device 110 writes the second part 320 of data and location information of the first part of data in a second data file stored in a second external storage device 150, wherein the first external storage device 140 and the second external storage device 150 may be the same external storage apparatus or may be different external storage apparatuses. In other words, data required for retrieval of the data object and having high access frequency, and a data field occupying a relatively large space, are stored separately.

It should be understood that, first part 310 of data of different data objects may also be written into the same first data file, and location information of the first part of data of different data objects in the first external storage device 140 and the second part 320 of data may also be written into the second data file.

As an example, the first external storage device 140 may be a high speed external storage apparatus. According to at least some example embodiments of the inventive concepts, the first external storage device 140 may be a Solid State Drive (SSD), such as an SATA SSD, an NVMe SSD and the like. Thus, properties of high bandwidth and low delay of the SSD may be employed to rapidly read a required data field therefrom. In addition, a utility rate of the SSD may also be improved.

As an example, the second external storage device 150 may be a high speed external storage apparatus (for example, a SSD and the like), a magnetic disk, and etc.

As an example, the location information of the first part of data in the first external storage device 140 may be location information of structure description information of the first part of data in the first external storage device 140. Here, the structure description information of the first part of data may be regarded as description information of a specific organization form of the first part of data in the first data file. As an example, the structure description information of the first part of data may include location information and length information of respective data fields included in the first part 310 of data in the first data file.

As another example, the location information of the first part of data in the first external storage device 140 may be location information and length information of respective data fields included in the first part 310 of data in the first external storage device 140.

It should be noted that, after the data object storing device 110 determines the first part 310 of data to be written into the first data file and the first part 310 of data is written into a specific location of the first data file, an address of the first data file is available to a system, that is, the location information of the first part of data in the first external storage device 140 could be known (e.g., to the data object storing device 110). It is a well-known technique for those skilled in the art to acquire the location information of the first part of data in the first external storage device 140, and it will not be repeated again herein.

In addition, according to at least some example embodiments of the inventive concepts, step S103 may be executed after the entire first part 310 of data is stored into the first external storage device 140 (namely, all written in a disk).

In addition, as an example, the method of storing the data object according at least one example embodiment of the inventive concepts may further include a following step after step S102 and before step S103: the data object storing device 110 stores only the location information of the first part of data in the first external storage device 140 and the data object storing device 110 writes the second part 320 of data into a log file of the file system 100, and the data object storing device 110 stores the log file into the first external storage device 140 or the second external storage device 150. That is, according to at least some example embodiments of the inventive concepts, the data object storing device 110 does not write the first part 310 of data into the log file of the file system 100. According to at least some example embodiments of the inventive concepts, the data object storing device 110 may store log file into the second external storage device 150. That is, the data object storing device 110 may store the log file and the second part 320 of data into the same external storage apparatus.

In the prior art, all data of the data object are stored into the log file of a file system. Therefore, there may be a problem in that a large amount of external storage apparatus space is occupied by the log file, resulting in a low data writing speed. However, according at least one example embodiment of the inventive concepts, the external storage apparatus space occupied by the log file of a file system can be effectively reduced, and this could improve the data writing speed.

According to at least some example embodiments of the inventive concepts, the method of storing the data object according at least one example embodiment of the inventive concepts may further include the data object storing device 110 loading location information of the first part of data in the first external storage device 140, and the data object storing device 110 loading the second part 320 of data into a cache region of a memory (e.g., the cache region 135 of the working memory 130) from the second external storage device 150 in response to the data object storing device 110 receiving a reading request for the data field of the data object. That is, according to at least some example embodiments of the inventive concepts, the data object storing device 110 may store only the data required for retrieval of the data object and having high access frequency is loaded into the cache region, to ensure most information required for the retrieval can be obtained from a cache while reducing a cache space occupied by respective data objects, so that a data retrieval speed is not influenced.

As an example, in the cache region of the memory (e.g., the cache region 135 of the working memory 130), data of the data object loaded into the cache region may be managed in one of forms of a B tree, a B+ tree, a Hash table, and a skip list.

Figure 2:
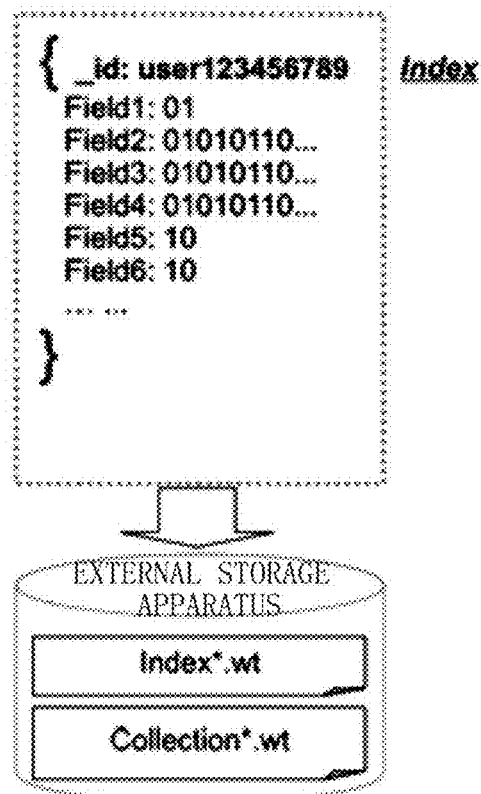
FIG. 2 illustrates an example of an existing method of storing a data object.
Figure 3:
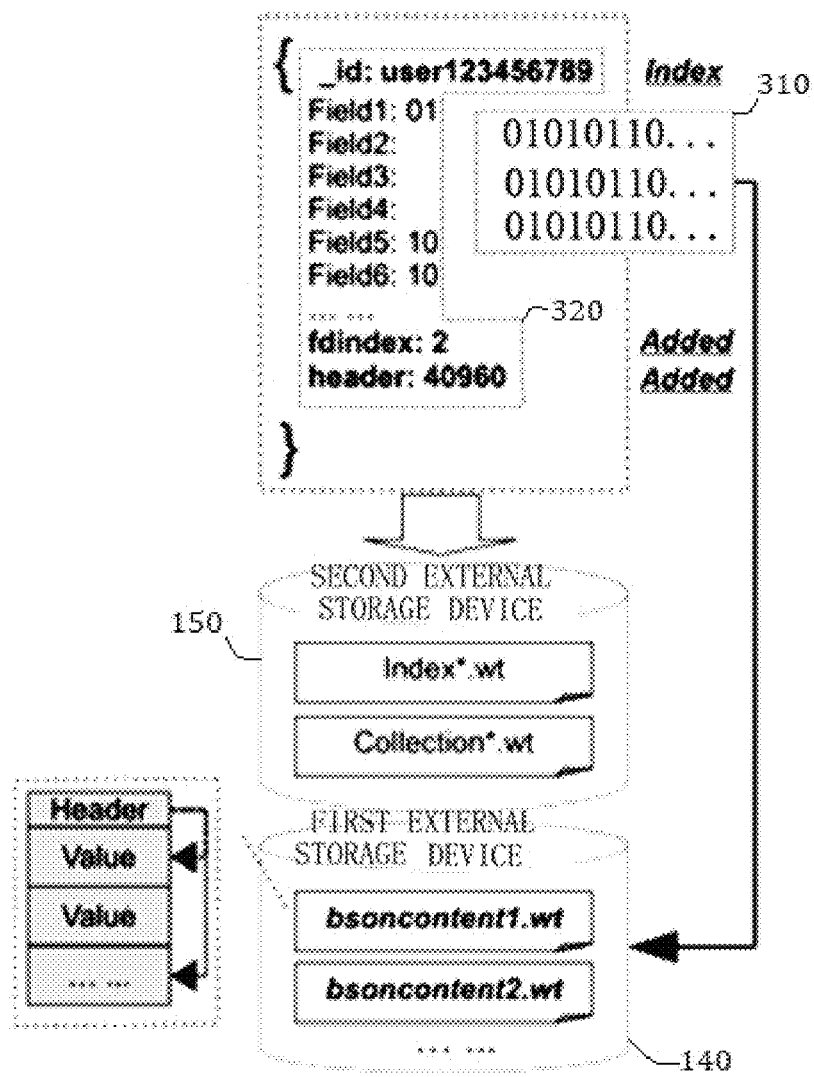
FIG. 3 illustrates an example of a method of storing a data object according to at least one example embodiment of the inventive concepts.

Taking a NoSQL database MongoDB as an example, in the MongoDB, the data object is stored in a form of a document (a group of nestable K-V pairs similar to a form of JSON), and the document has a group of key-value pairs therein. Adding, deleting, modifying and searching on MongoDB are performed in a basic unit of the document. As shown in FIG. 2, in the prior art, when a database (e.g., the data object storing device 110) receives a writing request for the data object, all data of the data object are stored together into the external storage apparatus directly by a storage engine. According to at least one example embodiment of the inventive concepts, as shown in FIG. 3, when a database (e.g., the data object storing device 110) receives the writing request for the data object, the data object to be written may be blocked (e.g., by the data object storing device 110), and the data of the data object may be divided (e.g., by the data object storing device 110) into the first part 310 of data and the second part 320 of data. At this time, what remains in the document are only the meta data (for example, including an index field and description information thereof (_id: user123456789), and description information of respective data fields (Field1, Field2, . . . )), and at the same time, location information of the first part of data of the data object in the first external storage device 140 (for example, structure description information of the first part of data of the data object in the first external storage device 140 (for example, fdindex:2 and header:40960, wherein the former indicates a serial number of the first data file, and the latter indicates an offset of the structure description of the first part of data of the data object in the first data file)) may be added (e.g., by the data object storing device 110) into a corresponding location in the document. Then, the first part 310 of data of the data object may be stored (e.g., by the data object storing device 110) into the first data file of the first external storage device 140, wherein the data object storing device 110 may store the structure description information of the first part of data of the data object (namely, location information and length information of respective data fields included in the first part 310 of data in first data file) In a description information data block in the first data file. According to at least some example embodiments of the inventive concepts, after all of the first part of data of the data object are written in a disk, a reconstructed document may be continuously processed by a storage engine (e.g., a storage engine executed by the data object storing device 110) for a subsequent processing. For example, the storage engine may write the reconstructed document into the second data file stored in the second external storage device 150 in an existing way.

Figure 4:
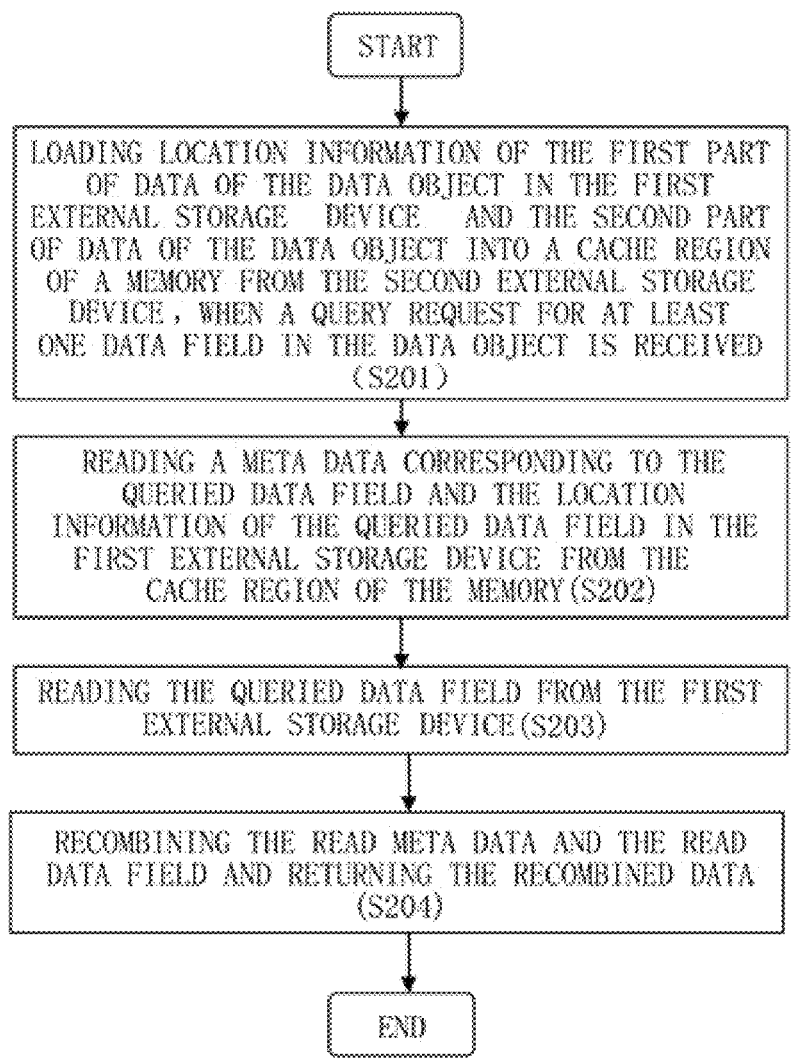
FIG. 4 illustrates a flowchart of a method of querying a data field of a data object according to at least one example embodiment of the inventive concepts.

FIG. 4 illustrates a flowchart of a method of querying a data field of a data object according to at least one example embodiment of the inventive concepts.

Referring to FIG. 4, in step S201, in response a query request for at least one data field in the data object being received (e.g., by the data object storing device 110), location information of the first part of data of the data object in the first external storage device 140 and the second part 320 of data of the data object are loaded (e.g., by the data object storing device 110) into a cache region of a memory (e.g., the cache region 135 of the working memory 130) from the second external storage device 150.

In step S202, a meta data corresponding to the queried data field and the location information of the queried data field in the first external storage device 140 are read (e.g., by the data object storing device 110) from the cache region of the memory. For example, the meta data corresponding to the queried data field may be description information of the queried data field (for example, a name, a type, and the like).

In step S203, the queried data field is read (e.g., by the data object storing device 110) from the first external storage device 140 according to the read location information.

In particular, as an example, in the case where the location information of the first part of data of the data object is location information of the structure description information of the first part of data in the first external storage device 140, in step S202, the location information of the structure description information of the first part of data of the data object in the first external storage device 140 may be read (e.g., by the data object storing device 110). Next, in step S203, firstly the structure description information of the first part of data may be read (e.g., by the data object storing device 110) according to location information of the structure description information of the first part of data, and then the location information and the length information of the queried data field in the first data file are read (e.g., by the data object storing device 110) therefrom, and the queried data field is read (e.g., by the data object storing device 110) according to the location information and the length information.

As another example, in the case where the location information of the first part of data of the data object is the location information and the length information of respective data fields included in the first part 310 of data in the first external storage device 140, in step S202, the location information and the length information of the queried data field may be directly read (e.g., by the data object storing device 110), and in step S203, the queried data field may be directly read (e.g., by the data object storing device 110) from the first external storage device 140 according to the read location information.

In step S204, the read meta data and the read data field are recombined (e.g., by the data object storing device 110) and returned. For example, the recombined data may be filled (e.g., by the data object storing device 110) into a return list for a query request, and a return function may be invoked (e.g., by the data object storing device 110) to complete data return.

As an example, when the first part 310 of data of the data object includes the data field of which the length is larger than a desired or, alternatively, predetermined threshold value in the data object, and the second part 320 of data of the data object includes the meta data included in the data object and the data field of which the length is not larger than the desired or, alternatively, predetermined threshold value of the data object, step S202 may include determining (e.g., by the data object storing device 110) whether the queried data field is stored in the cache region of the memory (e.g., the cache region 135 of the working memory 130), wherein in response to a determination (e.g., by the data object storing device 110) that the queried data field is not stored in the cache region of the memory, the meta data corresponding to the queried data field and the location information of the queried data field in the first external storage device 140 are read (e.g., by the data object storing device 110) from the cache region of the memory, and in response to a determination (e.g., by the data object storing device 110) that the queried data field is stored in the cache region of the memory, the queried data field and its corresponding meta data are read (e.g., by the data object storing device 110) from the cache region of the memory, then directly executing step S204.

Figure 5:
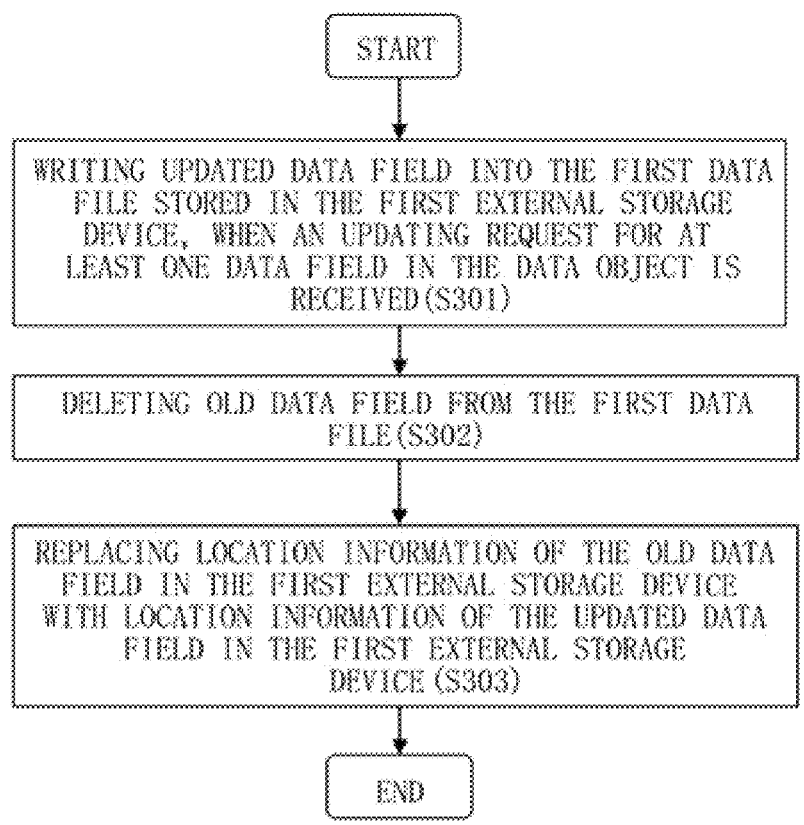
FIG. 5 illustrates a flowchart of a method of updating a data field of a data object according to at least one example embodiment of the inventive concepts.

FIG. 5 illustrates a flowchart of a method of updating a data field of a data object according to at least one example embodiment of the inventive concepts.

Referring to FIG. 5, in step S301, in response to an updating request for at least one data field in the data object being received (e.g., by the data object storing device 110), updated data field is written (e.g., by the data object storing device 110) into the first data file stored in the first external storage device 140.

In step S302, an old data field is deleted (e.g., by the data object storing device 110) from the first data file. That is, an update operation is performed (e.g., by the data object storing device 110) by adopting a writing way of sequentially adding the data, so as to change a random updating operation of the data into a sequential operation, to be suitable for a property of the SSD.

In step S303, location information of the old data field in the first external storage device 140 is replaced (e.g., by the data object storing device 110) with location information of the updated data field in the first external storage device 140.

In particular, as an example, in the case where the location information of the first part of data of the data object is the location information of the structure description information of the first part of data in the first external storage device 140, in step S303, in the structure description information of the first part of data, the location information and the length information of the old data field in the first data file may be replaced (e.g., by the data object storing device 110) by the location information and the length information of the updated data field in the first data file.

As another example, in the case where the location information of the first part of data of the data object is the location information and the length information of respective data fields included in the first part 310 of data in the first external storage device 140, in step S303, in the second data file, the location information and the length information of the old data field in the first external storage device 140 may be replaced (e.g., by the data object storing device 110) with the location information and the length information of the updated data field.

When the first part 310 of data of the data object includes the data field of which the length is larger than a desired or, alternatively, predetermined threshold value in the data object, and the second part 320 of data of the data object includes the meta data included in the data object and the data field of which the length is not larger than the desired or, alternatively, predetermined threshold value of the data object, the method of updating the data field of the data object in the above example is suitable for the case where both the length of the old data field and the length of the updated data field are larger than the threshold value. As an example, in response to both the length of the old data field and the length of the updated data field not being larger than the threshold value, in the second data file, the old data field may be replaced (e.g., by the data object storing device 110) with the updated data field. As an example, in response to the length of the old data field being larger than the desired or, alternatively, predetermined threshold value and the length of the updated data field is not larger than the desired or, alternatively, predetermined threshold value, the old data field may be deleted (e.g., by the data object storing device 110) from the first data file, and its location information and the length information may be correspondingly deleted (e.g., by the data object storing device 110) from the second data file, and the updated data field may be written (e.g., by the data object storing device 110) into the second data file. As an example, in response to the length of the old data field not being larger than the threshold value and the length of the updated data field is larger than the desired or, alternatively, predetermined threshold value, the old data field may be deleted (e.g., by the data object storing device 110) from the second data file, the updated data field may be written (e.g., by the data object storing device 110) into the first data file, and the location information and the length information of the updated data field in the first external storage device 140 may be written (e.g., by the data object storing device 110) into the second data file.

Figure 6:
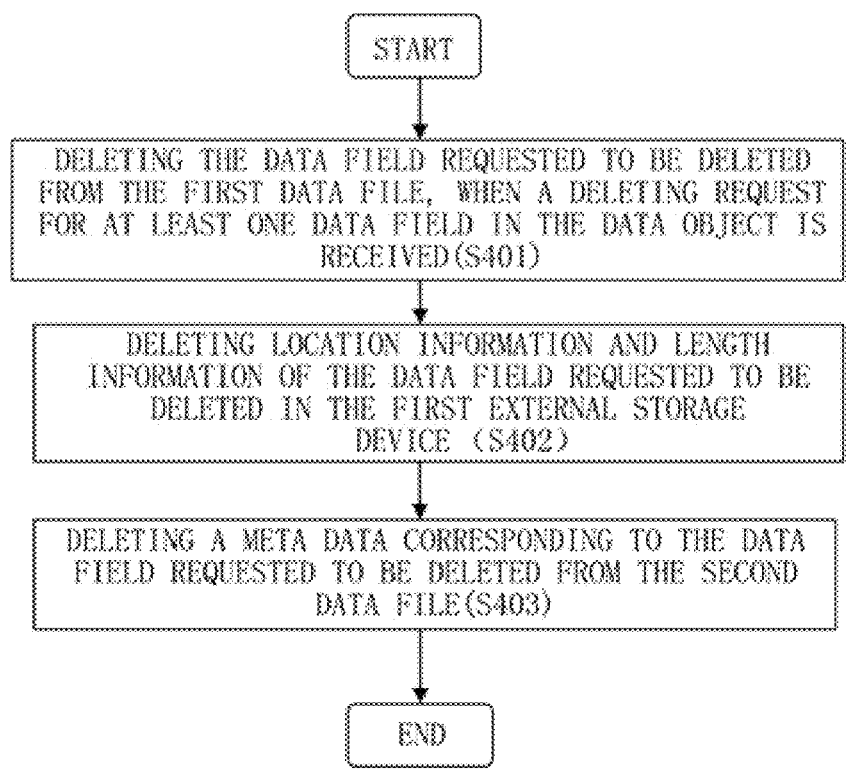
FIG. 6 illustrates a flowchart of a method of deleting a data field of a data object according to at least one example embodiment of the inventive concepts.

FIG. 6 illustrates a flowchart of a method of deleting a data field of a data object according to at least one example embodiment of the inventive concepts.

As shown in FIG. 6, in step S401, in response to a deleting request for at least one data field in the data object being received (e.g., by the data object storing device 110), the data field requested to be deleted is deleted (e.g., by the data object storing device 110) from the first data file.

In step S402, location information and length information of the data field required to be deleted in the first external storage device 140 are deleted (e.g., by the data object storing device 110).

In particular, as an example, in the case where the location information of the first part of data of the data object is the location information of the structure description information of the first part of data in the first external storage device 140, in step S402, the location information and the length information of the data field required to be deleted in the first data field are deleted (e.g., by the data object storing device 110) from the structure description information of the first part of data.

As another example, in the case where the location information of the first part of data of the data object is the location information and the length information of respective data fields included in the first part 310 of data in first external storage device 140, the location information and the length information of the data field required to be deleted in the first external apparatus may be deleted (e.g., by the data object storing device 110) from the second data file.

In step S403, a meta data corresponding to the data field required to be deleted is deleted (e.g., by the data object storing device 110) from the second data file.

When the first part 310 of data of the data object includes the data field of which the length is larger than a desired or, alternatively, predetermined threshold value in the data object, and the second part 320 of data of the data object includes the meta data included in the data object and the data field of which the length is not larger than the desired or, alternatively, predetermined threshold value of the data object, the method of deleting the data field of the data object in the above example is suitable for the case where the length of the data field to be deleted is larger than the desired or, alternatively, predetermined threshold value. In addition, as an example, in response to the length of the data field required to be deleted not being larger than the desired or, alternatively, predetermined threshold value, the data field required to be deleted and its corresponding meta data may be directly deleted (e.g., by the data object storing device 110) from the second data file.

Figure 7:
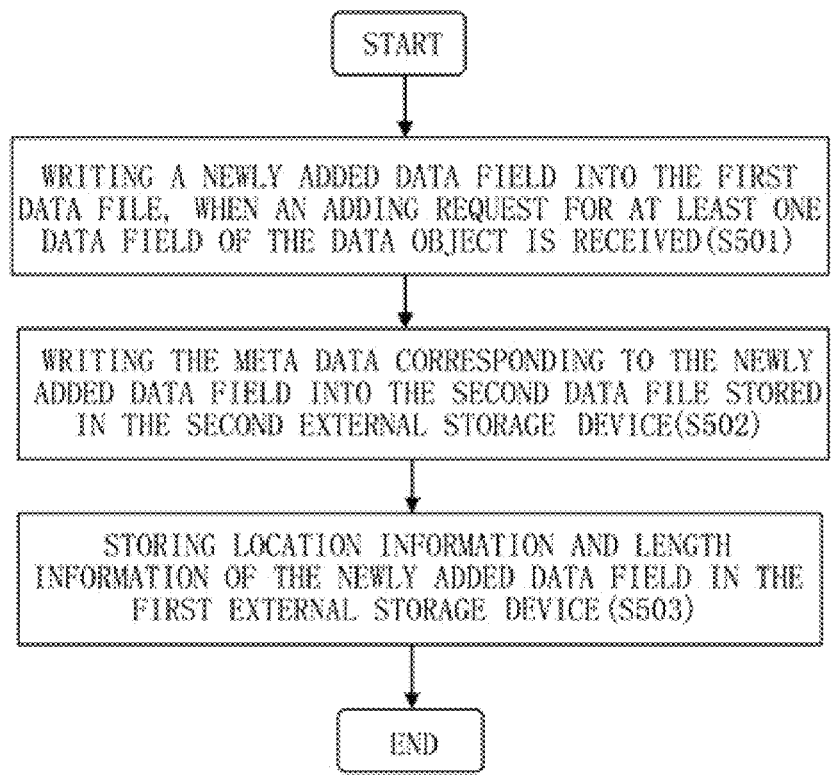
FIG. 7 illustrates a flowchart of a method of adding a data field of a data object according to at least one example embodiment of the inventive concepts.

FIG. 7 illustrates a flowchart of a method of adding a data field of a data object according to at least one example embodiment of the inventive concepts.

Referring to FIG. 7, in step S501, in response to an adding request for at least one data field of the data object being received (e.g., by the data object storing device 110), a newly added data field is written (e.g., by the data object storing device 110) into the first data file stored in the first external storage device 140.

In step S502, the meta data corresponding to the newly added data field is written (e.g., by the data object storing device 110) into the second data file stored in the second external storage device 150.

In step S503, location information and length information of the newly added data field in the first external storage device 140 is stored (e.g., by the data object storing device 110).

In particular, as an example, in the case where the location information of the first part of data of the data object is the location information of the structure description information of the first part of data in the first external storage device 140, the location information and the length information of the newly added data field in the first data field are stored (e.g., by the data object storing device 110) into the structure description information of the first part of data of the data object.

As another example, in the case where the location information of the first part of data of the data object is the location information and the length information of respective data fields included in the first part 310 of data in first external storage device 140, the location information and length information of the newly added data field in the first external storage device 140 are written (e.g., by the data object storing device 110) into the second data file.

It should be understood that, when the first part 310 of data of the data object includes the data field of which the length is larger than a desired or, alternatively, predetermined threshold value in the data object, and the second part 320 of data of the data object includes the meta data included in the data object and the data field of which the length is not larger than the desired or, alternatively, predetermined threshold value of the data object, step S501 may include determining (e.g., by the data object storing device 110) whether a length of a newly added data field is larger than a desired or, alternatively, predetermined threshold value when an adding request for at least one data field of the data object is received, wherein in response to a determination (e.g., by the data object storing device 110) that the length is larger than the threshold value, the newly added data field is written (e.g., by the data object storing device 110) into the first data file stored in the first external storage device 140; and in response to a determination (e.g., by the data object storing device 110) that the length is not larger than the desired or, alternatively, predetermined threshold value, the newly added data field and its corresponding meta data may be directly written (e.g., by the data object storing device 110) into the second data file stored in the second external storage device 150.

Figure 8:
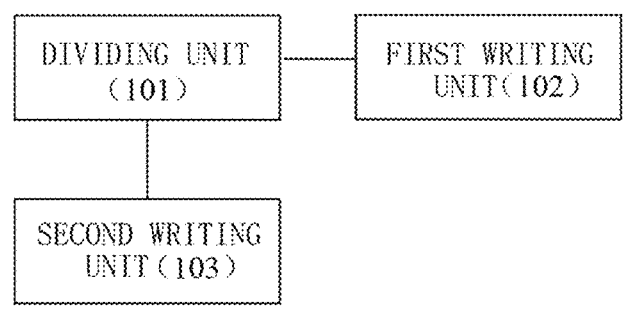
FIG. 8 illustrates a block diagram illustrating an example of a data object storing device of the file system of FIG. 1 according to at least one example embodiment of the inventive concepts.

FIG. 8 is a block diagram illustrating an example of the data object storing device 110 of the file system 100 of FIG. 1 according to at least one example embodiment of the inventive concepts.

As is shown in FIG. 8, the data object storing device 110 may implement the functions of a plurality of units including, for example, a dividing unit 101, a first writing unit 102 and a second writing unit 103.

The dividing unit 101 is configured to split data of a data object into a first part 310 of data and a second part 320 of data, in response to a writing request of a data object being received (e.g., by the data object storing device 110), wherein the first part 310 of data includes a data field of the data object, and the second part 320 of data includes a meta data of the data object.

As an example, the meta data of the data object may include an index field of the data object and description information of the index field, and description information of respective data fields of the data object.

As an example, the first part 310 of data may include all of the data fields in the data object, and the second part 320 of data may include the meta data included in the data object.

As another example, a length of the data field included in the first part 310 of data may be larger than a desired or, alternatively, predetermined threshold value, and the second part 320 of data may further include a data field in the data object, wherein a length of the data field is not larger than the desired or, alternatively, predetermined threshold value. In other words, the first part 310 of data may include a data field a length of which is larger than a desired or, alternatively, predetermined threshold value in the data object, and the second part 320 of data may include the meta data included in the data object and a data field of which the length is not larger than the desired or, alternatively, predetermined threshold value in the data object. Here, it should be understood that a size of the desired or, alternatively, predetermined threshold value may be set (e.g., by the data object storing device 110) according to an actual situation (for example, a size of a memory and the like).

The first writing unit 102 is configured to write the first part 310 of data into a first data file stored in a first external storage device 140.

The second writing unit 103 is configured to write location information of the first part of data in the first external storage device 140 and the second part 320 of data into a second data file stored in a second external storage device 150, wherein the first external storage device 140 and the second external storage device 150 are the same external storage apparatus or different external storage apparatuses.

As an example, the location information of the first part of data in the first external storage device 140 may be location information of structure description information of the first part of data in the first external storage device 140. Here, the structure description information of the first part of data may be understood as description information of a specific organization form of the first part of data in the first data file. As an example, the structure description information of the first part of data may include location information and length information of respective data fields included in the first part 310 of data in the first data file.

As another example, the location information of the first part of data in the first external storage device 140 may be location information and length information of respective data fields included in the first part 310 of data in the first external storage device 140.

As an example, the data object storing device 110 according at least one example embodiment of the inventive concepts may implement the functions of a loading unit (not shown).

The loading unit is configured to load the location information of the first part of data in the first external storage device 140 and the second part 320 of data into a cache region of a memory (e.g., the cache region 135 of the working memory 130) from the second external storage device 150, in response a reading request for the data object being received.

As an example, the data object storing device 110 according at least one example embodiment of the inventive concepts may implement the functions of a third writing unit (not shown) and a log file storage unit (not shown).

The third writing unit is configured to write the location information of the first part of data in the first external storage device 140 and the second part 320 of data into a log file of the file system 100 after the first writing unit 102 writes the first part 310 of data into the first data file stored in the first external storage device 140 and before the second writing unit 103 writes the location information of the first part of data in the first external storage device 140 and the second part 320 of data into the second data file stored in the second external storage device 150.

The log file storage unit is configured to store the log file into the first external storage device 140 or the second external storage device 150.

As an example, the data object storing device 110 according at least one example embodiment of the inventive concepts may implement the functions of a loading unit (not shown), a reading unit (not shown), and a return unit (not shown).

The loading unit is configured to, load location information of the first part of data of the data object in the first external storage device 140 and the second part 320 of data of the data object into a cache region of a memory (e.g., the cache region 135 of the working memory 130) from the second external storage device 150 in response to a query request of at least one data field in the data object being received (e.g., by the data object storing device 110).

The reading unit is configured to read a meta data corresponding to the queried data field and the location information of the queried data field in the first external storage device 140 from the cache region of the memory, and read the queried data field from the first external storage device 140 according to the read location information.

The return unit is configured to combine the read meta data and the read data field and return the recombined data.

As an example, the data object storing device 110 according at least one example embodiment of the inventive concepts may implement the functions of a first field deleting unit (not shown) and a first location information updating unit (not shown).

As an example, in response to an updating request for at least one data field in the data object being received (e.g., by the data object storing device 110), the first writing unit 102 writes updated data field into the first data file stored in the first external storage device 140.

The field deleting unit is configured to delete the old data field from the first data file.

The location information updating unit is configured to replace location information of the old data field in the first external storage device 140 with location information of the updated data field in the first external storage device 140.

As an example, the data object storing device 110 according at least one example embodiment of the inventive concepts may implement the functions of a second field deleting unit (not shown), a second location information updating unit (not shown), and a meta data deleting unit (not shown).

The second field deleting unit is configured to delete the data field required to be deleted from the first data file in response to a deleting request for at least one data field in the data object being received (e.g., by the data object storing device 110).

The second location information updating unit is configured to delete location information of the data field required to be deleted in the first external storage device 140.

The meta data deleting unit is configured to delete a meta data corresponding to the data field required to be deleted from the second data file of the second external storage device 150.

In addition, as an example, in response to an adding request for at least one data field of the data object being received (e.g., by the data object storing device 110), the first writing unit 102 may write a newly added data field into the first data file stored in the first external storage device 140; in the case where the location information of the first part of data of the data object is the location information of the structure description information of the first part of data in the first external storage device 140, the first writing unit 102 may store the location information and the length information of the newly added data field in the first data field into the structure description information of the first part of data of the data object, and the second writing unit 103 may write a meta data corresponding to the newly added data field into the second data file stored in the second external storage device 150; and in the case where the location information of the first part of data of the data object is the location information and the length information of respective data fields included in the first part 310 of data in first external storage device 140, the second writing unit 103 may write the location information of the newly added data field in the first external storage device 140 and the meta data corresponding to the newly added data field into the second data file.

According to at least some example embodiments of the inventive concepts, operations described in the present disclosure as being performed by a unit of the data object storing device 110 (e.g., the dividing unit 101, first writing unit 102, second writing unit 103, loading unit, third writing unit, log file storage unit, reading unit, returning unit, field deleting unit, location information updating unit, meta data deleting unit) may be performed by the processor 120 executing program code that includes computer-executable instructions corresponding to the operations and is stored in, for example, the working memory 130.

It should be understood that a specific way of implementing a data object storing device according at least one example embodiment of the inventive concepts may be carried out by referring to FIGS. 1-7, and is not repeated herein. As an example, according to at least one example embodiment of the inventive concepts, there is provided a computer readable storage medium, having a computer program stored thereon, wherein the computer program is configured to make a processor of a computer to execute the method of storing the data object as described in the above example.

The method and device of storing the data object according at least one example embodiment of the inventive concepts provide a new organization form of the data object, and store the data which is required for retrieve of a data object and has high access frequency to be separated from a big data block which is less relevant to the retrieve, so that in response to a reading request for the data object being received (e.g., by the data object storing device 110), only the data which is required for retrieve of a data object and has high access frequency of which is relatively high is loaded (e.g., by the data object storing device 110) into a cache region (e.g., the cache region 135 of the working memory 130), effectively reducing a cache space occupied by respective data objects. Therefore, more meta data can be stored in the memory, so that the B tree, the Hash table, or the like may has a more completed structure. Further, structure adjustment may be performed less frequently, and thus, fewer processor resources may be used for performing the structure adjustment. Moreover, a utility rate of an SSD may be efficiently improved.

In addition, it should be understood that each of the units in the device of storing the data object according to the embodiment of the present disclosure may be implemented as a hardware component and/or a software component. According to defined processing performed by each of the units, those skilled in the art may implement each of the units for example by using a Field Programmable Gate Array (FPGA) or an Application Specific Integrated Circuit (ASIC).

In addition, the method of storing the data object according at least one example embodiment of the inventive concepts may be implemented as a computer code in a computer readable recording medium. Those skilled in the art may implement the computer code according to the descriptions of the above method. When the computer code is executed in a computer, the above method of the present disclosure is implemented.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed:

1. A method of storing a data object, the method comprising:
   receiving a writing request for a data object, the data object including a data field and meta data;
   dividing the data object, including the data field and the meta data, into a first part of data and a second part of data, in response to receiving the writing request for the data object, such that the first part of data includes the data field of the data object, the second part of data includes the meta data of the data object, the first part of data is larger than the second part of data, and the second part of the data includes data with a higher access frequency than the first part of data;
   writing the first part of data into a first data file stored in a first external storage device; and
   writing first location information and the second part of data into a second data file stored in a second external storage device,
   wherein the first location information includes location information of the first part of data within the first external storage device, and
   wherein the meta data of the data object includes information describing a data property of the data object.

2. The method of claim 1, wherein,
   a length of the data field included in the first part of data is larger than a first threshold value, and
   the second part of data further includes a data field in the data object, a length of the data field included in the second part of data not being larger than a second threshold value.

3. The method of claim 1, further comprising:
   after writing the first part of data into the first data file stored in the first external storage device, and before writing the first location information and the second part of data into the second data file stored in the second external storage device,
   writing the first location information and the second part of data into a log file of a file system; and
   storing the log file into the first external storage device or the second external storage device.

4. The method of claim 1, further comprising:
   in response to receiving a reading request for the data object,
   loading the first location information and the second part of data into a cache region of a memory from the second external storage device;
   reading the data field of the data object from the first external storage device;
   reading the meta data of the data object included in the second part of data from the cache region of the memory;
   generating recombined data by recombining the read meta data with the read data field; and
   returning the recombined data.

5. The method of claim 1, wherein,
   the first location information is location information of structure description information of the first part of data in the first external storage device, and the structure description information includes location information and length information of respective data fields included in the first part of data in the first data file; or
   the first location information is location information and length information of the respective data fields included in the first part of data within the first external storage device.

6. The method of claim 1, wherein the first external storage device and the second external storage device are the same external storage device.

7. The method of claim 1, wherein the first external storage device and the second external storage device are different external storage devices.

8. A device of storing a data object, the device comprising:
   memory storing computer-executable instructions; and
   a processor configured to execute the computer-executable instructions such that the processor is configured to,
   receive a writing request for a data object, the data object including a data field and meta data,
   divide the data object, including the data field and the meta data, into a first part of data and a second part of data, in response to receiving the writing request for the data object such that the first part of data includes the data field of the data object, the second part of data includes the meta data of the data object, the first part of the data is larger than the second part of the data, and the second part of the data includes data with a higher access frequency than the first part of data, write the first part of data into a first data file stored in a first external storage device, and write first location information and the second part of data into a second data file stored in a second external storage device, wherein the first location information including location information of the first part of data within the first external storage device, and wherein the meta data of the data object includes information describing a data property of the data object.

9. The device of claim 8, wherein the processor is configured to execute the computer-executable instructions such that, a length of the data field included in the first part of data is larger than a first threshold value, and the second part of data further includes a data field in the data object, a length of the data field of the second part of data not being larger than a second threshold value.

10. The device of claim 8, wherein the processor is configured to execute the computer-executable instructions such that the processor is further configured to, write the first location information and the second part of data into a log file of a file system, after the writing of the first part of data into the first data file stored in the first external storage device and before the writing of the first location information and the second part of data into the second data file stored in the second external storage device, and store the log file into the first external storage device or the second external storage device.

11. The device of claim 8, wherein the processor is configured to execute the computer-executable instructions such that the processor is further configured to load the first location information and the second part of data from the second external storage device into a cache region of a memory, in response to receiving a reading request of the data object.

12. The device of claim 8, wherein, the first location information is location information of structure description information of the first part of data in the first external storage device, and the structure description information includes location information and length information of respective data fields included in the first part of data in the first data file; or the first location information is location information and length information of the respective data fields included in the first part of data in the first external storage device.

13. The device of claim 12, wherein the first external storage device and the second external storage device are the same external storage device.

14. The device of claim 12, wherein the first external storage device and the second external storage device are different external storage devices.

15. A non-transitory computer readable storage medium storing computer-executable instructions that, when executed by a processor, cause the processor to perform operations including:

receiving a writing request for a data object, the data object including a data field and meta data;

dividing the data object, including the data field and the meta data, into a first part of data and a second part of data, in response to receiving the writing request of the data object, such that the first part of data includes the data field of the data object, the second part of data includes the meta data of the data object, the first part of data is larger than the second part of data, and the second part of the data includes data with a higher access frequency than the first part of data;

writing the first part of data into a first data file stored in a first external storage device; and writing location information of the first part of data in the first external storage device and the second part of data into a second data file stored in a second external storage device, wherein the meta data of the data object includes information describing a data property of the data object.

16. The non-transitory computer readable storage medium of claim 15, wherein the first external storage device and the second external storage device are the same external storage device.

17. The non-transitory computer readable storage medium of claim 15, wherein the first external storage device and the second external storage device are different external storage devices.

18. The method of claim 1, further comprising:

updating the data field stored in the first data file in response to an update request;

deleting an old data field from the first data file; and updating the first location information by replacing location information of the old data field with location information of the updated data field.

19. The device of claim 8, wherein the processor is configured to execute the computer-executable instructions such that the processor is further configured to:

update the data field stored in the first data file in response to an update request;

delete an old data field from the first data file; and update the first location information by replacing location information of the old data field with location information of the updated data field.

20. The device of claim 15, wherein the computer-executable instructions, when executed by a processor, cause the processor to further perform operations including:

update the data field stored in the first data file in response to an update request;

delete an old data field from the first data file; and update the first location information by replacing location information of the old data field with location information of the updated data field.

* * * * *